United States Patent
Hatano et al.

(10) Patent No.: US 10,886,868 B2
(45) Date of Patent: Jan. 5, 2021

(54) MOTOR CONTROL APPARATUS, CONTROL METHOD THEREOF, AND PROGRAM

(71) Applicant: TOYOTA JIDOSHA KABUSHIKI KAISHA, Toyota (JP)

(72) Inventors: Akira Hatano, Toyota (JP); Yu Sasaki, Toyota (JP); Yoshihiro Okumatsu, Nagakute (JP); Hiroyuki Iyama, Okazaki (JP); Yuki Nomura, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/386,716

(22) Filed: Apr. 17, 2019

(65) Prior Publication Data
US 2019/0372503 A1  Dec. 5, 2019

(30) Foreign Application Priority Data
May 31, 2018  (JP) .................. 2018-105156

(51) Int. Cl.
| | | |
|---|---|---|
| H02P 23/00 | (2016.01) |
| H02P 25/00 | (2006.01) |
| H02P 27/00 | (2006.01) |
| H02P 27/04 | (2016.01) |
| H02P 27/08 | (2006.01) |
| H02P 27/14 | (2006.01) |

(52) U.S. Cl.
CPC ............ *H02P 27/085* (2013.01); *H02P 27/14* (2013.01)

(58) Field of Classification Search
CPC .............................. H02P 27/085; H02P 27/12
USPC ................................................... 318/811
See application file for complete search history.

(56) References Cited

U.S. PATENT DOCUMENTS

| | | | |
|---|---|---|---|
| 2005/0174076 A1* | 8/2005 | Katanaya | H02P 29/0241 318/400.28 |
| 2008/0061728 A1* | 3/2008 | Tomigashi | H02M 7/217 318/768 |
| 2008/0079385 A1* | 4/2008 | Hashimoto | H02P 21/18 318/801 |
| 2010/0164416 A1* | 7/2010 | Yamada | H02P 27/08 318/400.13 |

(Continued)

FOREIGN PATENT DOCUMENTS

| | | |
|---|---|---|
| JP | 2008-265645 A | 11/2008 |
| JP | 2010-148301 A | 7/2010 |

*Primary Examiner* — Erick D Glass
(74) *Attorney, Agent, or Firm* — Oliff PLC

(57) ABSTRACT

A motor control apparatus includes an inverter comprising switching elements, current detection means for detecting a phase current value output from the inverter to each phase of a three-phase AC motor, conversion means for converting the phase current value into a digital AD conversion value, and modulation means for comparing a phase voltage command value based on the AD conversion value from the conversion means with a PWM counter value generated using a timer operating at predetermined cycles to generate a PWM signal and outputting the generated PWM signal to the inverter to thereby switch the switching elements of the inverter and control the three-phase AC motor. The conversion means outputs the AD conversion value acquired by converting the phase current value at a timing when a rectangular width of a rectangular wave of a phase voltage value corresponding to the PWM counter value is long.

8 Claims, 6 Drawing Sheets

(56) References Cited

U.S. PATENT DOCUMENTS

2015/0270796 A1\* 9/2015 Watanabe ............. B60L 15/007
                                                     318/400.05
2017/0093320 A1\* 3/2017 Usuda ..................... H02P 27/08

\* cited by examiner

MOTOR CONTROL APPARATUS, CONTROL METHOD THEREOF, AND PROGRAM

CROSS REFERENCE TO RELATED APPLICATIONS

This application is based upon and claims the benefit of priority from Japanese patent application No. 2018-105156, filed on May 31, 2018, the disclosure of which is incorporated herein in its entirety by reference.

BACKGROUND

The present disclosure relates to a motor control apparatus for controlling a three-phase AC motor, a control method thereof, and a program.

A motor control apparatus that converts a phase current value of a three-phase AC motor detected by a current sensor into a digital AD conversion value, generates a current command value based on this converted AD conversion value, and switches a switching element of an inverter based on the current command value to control the three-phase AC motor is known (e.g., Japanese Unexamined Patent Application Publication Nos. 2010-148301 and 2008-265645).

The motor control apparatus disclosed in Japanese Unexamined Patent Application Publication No. 2010-148301 corrects the current command value in order to prevent a switching noise of the inverter from occurring. However, the present inventor has found a problem that the correction of the current command value may cause a waveform of the current command value to be distorted, thus adversely affecting the, motor control. The present, inventor has found another problem that in the motor control apparatus disclosed in Japanese Unexamined Patent Application Publication No. 2008-265645, when a duty ratio changes, the switching noise of the inverter may not be prevented from occurring, and thus the motor control may be adversely affected.

SUMMARY

The present disclosure has been made to solve such a problem. A main object of the present disclosure is to provide a motor control apparatus capable of preventing a switching noise from occurring and highly accurately controlling a motor, a control method thereof, and a program.

An example aspect of the present disclosure to achieve the above object is a motor control apparatus including:

an inverter including a plurality of switching elements configured to be switched on and off;

current detection means for detecting a phase current value output from the inverter to each phase of a three-phase AC motor;

conversion means for converting the phase current value detected by the current detection means into a digital AD conversion value; and modulation means for comparing a phase voltage command value based on the AD conversion value from the conversion means with a PWM counter value generated using a timer operating at predetermined cycles to generate a PWM signal and outputting the generated PWM signal to the inverter to thereby switch the switching elements of the inverter and control the three-phase AC motor.

The conversion means outputs the AD conversion value acquired by converting the phase current value at a timing when a rectangular width of a rectangular wave of a phase voltage value corresponding to the PWM counter value is long.

In this example aspect, the PWM counter value is a triangular wave, when the phase voltage value is made high while the PWM counter value is greater than or equal to a threshold, and the phase voltage value is made low while the PWM counter value is less than the threshold, if the conversion means determines that a duty ratio of the PWM signal is 50% or higher, it may output the AD conversion value acquired by converting the phase current value at a timing when the PWM counter value becomes a maximum value, whereas if the conversion means determines that the duty ratio of the PWM signal is less than 50%, it may output the AD conversion value acquired by converting the phase current value at a timing when the PWM counter value becomes a minimum value, and when the phase voltage value is made low while the PWM counter value is greater than or equal to the threshold, and the phase voltage value is made high while the PWM counter value is less than the threshold, if the conversion means determines that the duty ratio of the PWM signal is 50% or higher, it may output the AD conversion value acquired by converting the phase current value at the timing when the PWM counter value becomes the minimum value, whereas if the conversion means determines that the duty ratio of the PWM signal is less than 50%, it may output the AD conversion value acquired by converting the phase current value at the timing when the PWM counter value becomes the maximum value.

In this example aspect, the PWM counter value is a sawtooth wave, when the phase voltage value is made high while the PWM counter value is greater than or equal to a threshold, and the phase voltage value is made low while the PWM counter value is less than the threshold, if the conversion means determines that a duty ratio of the PWM signal is 50% or higher, it may output the AD conversion value acquired by converting the phase current value at a timing when the PWM counter value becomes ¾ of a maximum value of the PWM counter value, whereas if the conversion means determines that the duty ratio of the PWM signal is less than 50%, it may output the AD conversion value acquired by converting the phase current value at a timing when the PWM counter value becomes ¼ of the maximum value of the PWM counter value, and when the phase voltage value is made low while the PWM counter value is greater than or equal to the threshold, and the phase voltage value is made high while the PWM counter value is less than the threshold, if the conversion means determines that the duty ratio of the PWM signal is 50% or higher, it may output the AD conversion value acquired by converting the phase current value at the timing when the PWM counter value becomes ¼ of the minimum value of the PWM counter value, whereas if the conversion means determines that the duty ratio of the PWM signal is less than 50%, it may output the AD conversion value acquired by converting the phase current value at the timing when the PWM counter value becomes ¾ of the maximum value of the PWM counter value.

In this example aspect, the conversion means may acquire the phase current value a plurality of times only for a predetermined period of time at the timing when the rectangular width of the rectangular wave of the phase voltage value corresponding to the PWM counter value is long, convert each of the acquired plurality of phase current values into the AD conversion value, and output an average value of the plurality of converted AD conversion values.

In this example aspect, the predetermined period of time may be calculated by subtracting a duration of a switching noise in the switching elements from a ½ cycle of the PWM signal.

Another example aspect of the present disclosure to achieve the above object is a method of controlling a motor control apparatus including:

an inverter including a plurality of switching elements configured to be switched on and off;

current detection means for detecting a phase current value output from the inverter to each phase of a three-phase AC motor;

conversion means for converting the phase current value detected by the current detection means into a digital AD conversion value; and modulation means for comparing a phase voltage command value based on the AD conversion value from the conversion means with a PWM counter value generated using a timer operating at predetermined cycles to generate a PWM signal and outputting the generated PWM signal to the inverter to thereby switch the switching elements of the inverter and control the three-phase AC motor. The method may include outputting the AD conversion value acquired by converting the phase current value at a timing when a rectangular width of a rectangular wave of a phase voltage value corresponding to the PWM counter value is long.

Another example aspect of the present disclosure to achieve the above object is a program for a motor control apparatus including:

an inverter including a plurality of switching elements configured to be switched on and off;

current detection means for detecting a phase current value output from the inverter to each phase of a three-phase AC motor;

conversion means for converting the phase current value detected by the current detection means into a digital AD conversion value; and modulation means for comparing a phase voltage command value based on the AD conversion value from the conversion means with a PWM counter value generated using a timer operating at predetermined cycles to generate a PWM signal and outputting the generated PWM signal to the inverter to thereby switch the switching elements of the inverter and control the three-phase AC motor. The program may cause a computer to execute outputting the AD conversion value acquired by converting the phase current value at a timing when a rectangular width of a rectangular wave of a phase voltage value corresponding to the PWM counter value is long.

According to the present disclosure, it is possible to provide a motor control apparatus capable of preventing a switching, noise from occurring and highly accurately controlling a motor, a control method thereof, and a program.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
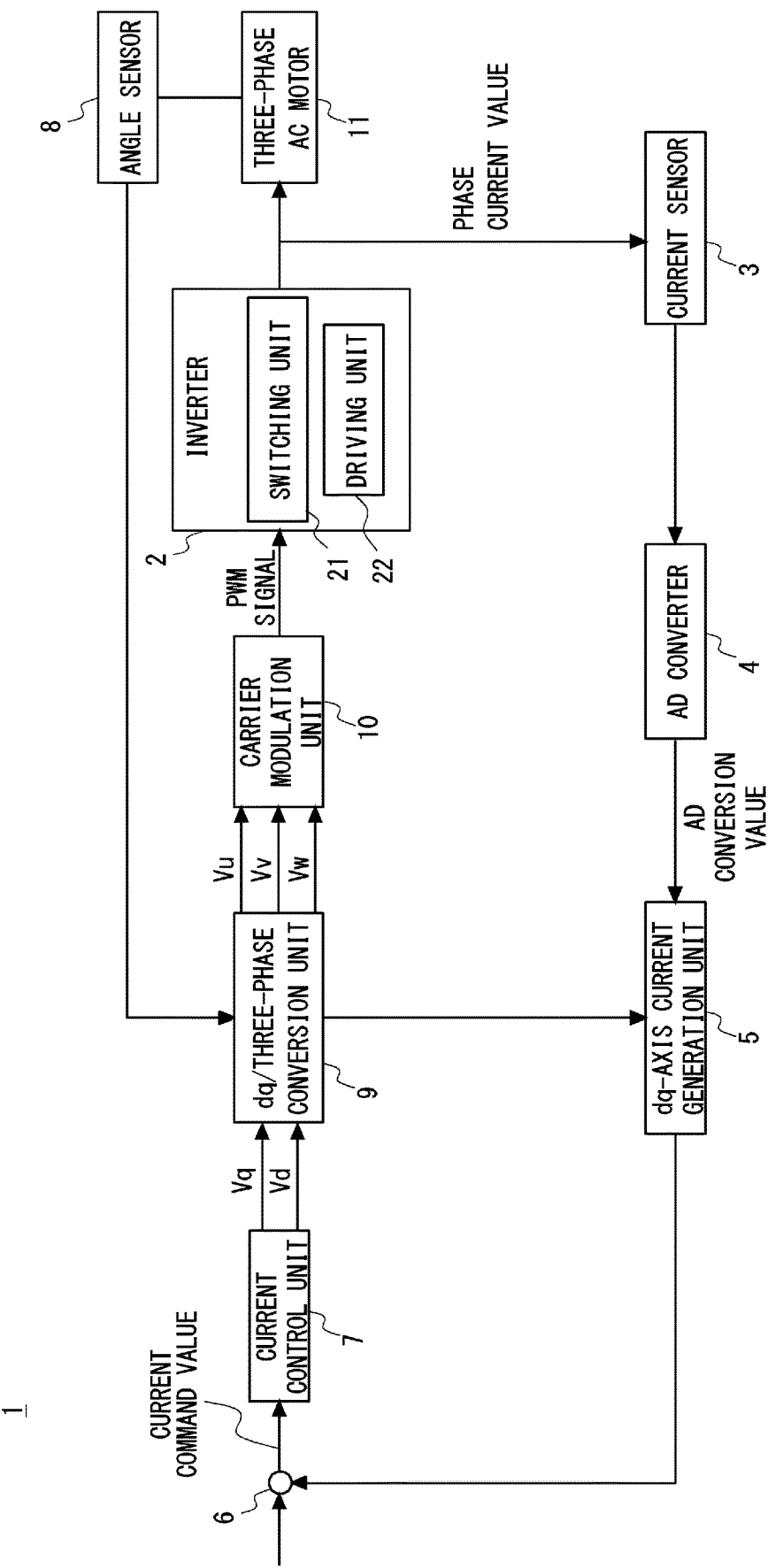
FIG. 1 is a block diagram showing, a schematic system configuration of a motor control apparatus according to a first embodiment of the present disclosure.

Hereinafter, embodiments of the present disclosure will be described with reference to the drawings. FIG. 1 is a block diagram showing a schematic, system configuration of a motor control apparatus according to a first embodiment of the present disclosure. A motor control apparatus 1 according to the first embodiment controls a three-phase AC motor 11. The three-phase AC motor 11 includes, for example, a rotor and a stator and is composed of a U-phase, a V-phase, and a W-phase.

The motor control apparatus 1 according to the first embodiment includes an inverter 2, a current sensor 3, an AD converter 4, a dq-axis current generation unit 5, a calculation unit 6, a current control unit 7, an angle sensor 8, a dq/three-phase conversion unit 9, and a carrier modulation unit 10.

Note that a main hardware configuration of the motor control apparatus 1 includes a microcomputer composed of, for example, a CPU (Central Processing Unit) that performs calculation processing, and control processing etc., a memory composed of a ROM (Read Only Memory) and a RAM (Random Access Memory) storing a calculation program and a control program etc. executed by the CPU, a control program, etc., an interface unit (I/F) that inputs and outputs signals to and from the outside. The CPU, the memory, and the interface unit are connected to one another through a data bus or the like.

The inverter 2 includes a switching unit 21 that performs power conversion and a driving unit 22 that drives the switching unit 21. The switching unit 21 includes, for example, a plurality of switching elements such as an IGBT (Insulated Gate Bipolar Transistor) and a MOSFET (metal-oxide-semiconductor field-effect transistor) and a shunt resistor.

The inverter 2 converts a DC current value into a three-phase AC current value by switching on and off the switching elements of the switching unit 21 according to a PWM signal from the carrier modulation unit 10. The inverter 2 outputs three phase current values converted into AC to the three-phase AC motor 11.

The current sensor 3 is a specific example of current detection means. The current sensor 3 detects a phase current value output from the inverter 2 to each phase of the three-phase AC motor 11. The current sensor 3 outputs the detected phase current value of each phase to the AD converter 4.

The AD converter 4 is a specific example of conversion means. The AD converter 4 acquires the analog phase current values from the current sensor 3, and converts the acquired phase current values into digital phase current values (hereinafter referred to as AD conversion values).

The AD converter 4 outputs the converted AD conversion values of the respective phases to the dq-axis current generation unit 5.

The dq-axis current generation unit 5 calculates a dq-axis current value (d-axis and q-axis current values) of the three-phase AC motor 11 based on the AD conversion value of each phase from the AD converter 4 and a three-phase voltage command value from the dq/three-phase conversion unit 9. Here, as a coordinate system rotating in synchronization with rotation of the three-phase AC motor 11, a direction of a magnetic flux of a permanent magnet of the three-phase AC motor 11 is defined as a d-axis, and an axis orthogonal to the d-axis is defined as a q-axis. The dq-axis current generation unit 5 outputs the calculated dq-axis current value to the calculation unit 6.

The calculation unit 6 adds the dq-axis current value from the dq-axis current generation unit 5 and the dq-axis current command value (the d-axis and q-axis current command values) according to a motor torque command value to calculate a current command value. The calculation unit 6 outputs the calculated current command value to the current control unit 7.

The current control unit 7 is a specific example of current control means. The current control unit 7 performs a proportional integration control process or the like based on the current command value from the calculation unit 6 to calculate the dq-axis voltage command value (the d-axis and q-axis voltage command values). The current control, unit 7 performs control in such a way that a stator current of the three-phase AC motor 11 follows the input current command value.

More specifically, the current control unit 7 first calculates a d-axis current deviation and a q-axis current deviation. The current control unit 7 calculates the d-axis current deviation and the q-axis current deviation by subtracting a dq-axis actual current value from the dq-axis current command value for each of the d-axis and q-axis, respectively. Then, the current control unit 7 performs a proportional integral control process to calculate a d-axis voltage command value Vq and a q-axis voltage command value Vd (hereinafter referred to as dq-axis voltage command values Vq and Vd) such that the d-axis current deviation and the q-axis current deviation become zero, respectively. The current control unit 7 outputs the calculated dq-axis voltage command values Vq and Vd to the qd/three-phase conversion unit 9.

The angle sensor 8 is provided in the three-phase AC motor 11 and detects a rotation angle of a rotor of the three-phase AC motor 11. The angle sensor 8 outputs the detected rotation angle to the dq/three-phase conversion unit 9.

The dq/three-phase conversion unit 9 calculates an electrical angle of the three-phase AC motor 11 based on the rotation angle from the angle sensor 8. The dq/three-phase conversion unit 9 performs a coordinate conversion process and the like on the dq-axis voltage command values Vq and Vd calculated by the current control unit 7 based on the calculated electrical angle of the three-phase AC motor 11 to calculate a phase voltage command value. More specifically, the dq phase conversion unit 9 converts, based on the calculated electrical angle, the dq-axis voltage command values Vq and Vd into voltage command values corresponding to three phases of the three-phase AC motor 11, i.e., calculates phase voltage command values Vu, Vv, and Vw, which have been subjected to the coordinate conversion process into the U-phase voltage command value, V-phase voltage command value, and the W-phase voltage command value. The dq/three-phase conversion unit 9 outputs the calculated phase voltage command values Vu, Vv, and Vw to the carrier modulation unit 10.

The carrier modulation unit 10 is a specific example of modulation means. The carrier modulation unit 40 generates a PWM counter value (a PWM carrier signal) using a timer operating at a predetermined cycle. The carrier modulation unit 10 compares the phase voltage command values Vu, Vv, Vw from the dq/three phase conversion unit 9 with the PWM counter value to generate a PWM (Pulse Width Modulation) signal. The carrier modulation unit 10 controls the three-phase AC motor 11 by outputting the generated PWM signal to the inverter 2 and switching the switching elements of the inverter 2.

Figure 2:
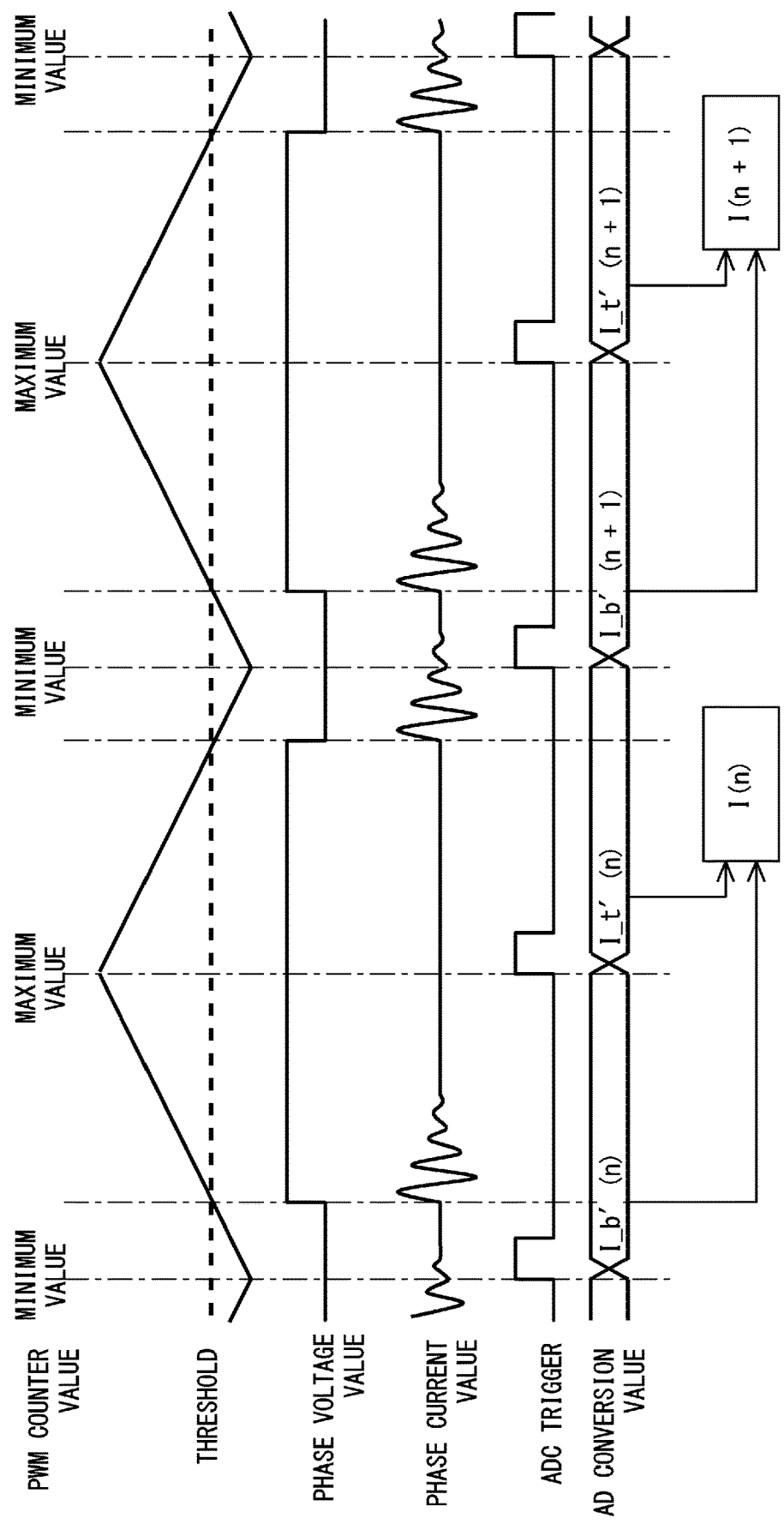
FIG. 2 is a timing chart of a PWM counter value, a phase voltage value, a phase current value, a trigger of an AD converter, and an AD conversion value.

FIG. 2 is a timing chart of the PWM counter value, a phase voltage value, a phase current value, a trigger of the AD converter, and the AD conversion value. The PMW count value (carrier wave is, for example, a triangular wave. The phase voltage value forms a rectangular wave which becomes high when the PMW count value greater than or equal to a threshold, and which becomes low when the PMW count value is less than the threshold. The threshold is set in the memory in advance.

As shown in FIG. 2, a noise (a switching noise) is generated in a phase current value of each phase detected by the current sensor 3 at the timing when the switching element of the inverter 2 is switched (at the timing when the PWM counter value switches from a peak value to a bottom value or from a bottom value to a peak value).

At this timing, when the AD converter converts the phase current value of each phase detected by the current sensor into a digital AD conversion value, the switching noise is superimposed on the AD conversion value, which may adversely affect the motor control.

On the other hand, in the motor control apparatus 1 according to the first embodiment, the AD converter 4 outputs the AD conversion value acquired by converting the phase current value at the timing when a rectangular width of the rectangular wave of the phase voltage value corresponding to the PWM counter value is long.

The timing at which the rectangular width of the rectangular wave of the phase voltage value is long is shifted from the timing when the switching noise is generated. Then, it is possible to prevent a switching noise from occurring and control the motor with high accuracy.

For example, the AD converter 4 outputs the AD conversion value acquired by converting the phase current value at the timing when the rectangular width of the rectangular wave of the phase voltage value corresponding to the PWM counter value is long, which is also the timing at which the PWM counter value becomes a maximum value or a minimum value.

More specifically, when the converter 4 determines that a duty ratio of the PWM signal is 50% or higher, it outputs the AD conversion value acquired by converting the phase current value at the timing when the PWM counter value becomes the maximum value, whereas when the AD converter 4 determines that the duty ratio of the PWM signal is less than 50%, it outputs the AD conversion value acquired by converting the phase current value at the timing when the PWM counter value becomes the minimum value.

When the duty ratio of the PWM signal is 50% or higher, the phase current value acquired at the timing when the PWM counter value becomes the maximum value is less influenced by the switching noise than the phase current value acquired at the timing when the PWM counter value becomes the minimum value. On the other hand, when the duty ratio of the PWM signal is less than 50%, the phase current value acquired at the timing when the PWM counter value becomes the minimum value is less influenced by the switching noise than the phase current value acquired at the timing when the PWM counter value becomes the maximum value. Thus, as described above, when the AD converter 4 determines that the duty ratio of the PWM signal is 50% or higher, it outputs the AD conversion value acquired by converting the phase current value at the timing when the PWM counter value becomes the maximum value, whereas when the AD converter 4 determines that the duty ratio of the PWM signal is less than 50%, it outputs the AD conversion value acquired by converting the phase current value at the timing when the PWM counter value becomes the minimum value. By doing so, it is possible to prevent a switching noise from occurring and control the motor with high accuracy.

When the duty ratio of the PWM signal becomes, close to 0% or 100%, the timing when the switching noise is generated overlaps the timing of the AD conversion by the AD converter 4, and the switching noise can be superimposed on the AD conversion value. Therefore, as described above, the AD converter 4 according to the first embodiment acquires the phase current values from the current sensor 3 at the timings when the PWM counter value becomes the maximum value and the minimum values, and converts the acquired phase current values into the digital AD conversion values. Then, the AD converter 4 outputs, to the dq-axis current generation unit 5, the AD conversion value that is less influenced by the switching noise among the AD conversion values at the timings when the PWM counter value becomes the maximum value and the minimum value.

For example, the AD converter 4 acquires a phase current value I_t from the current sensor 3, for example, at the timing when the PWM counter value becomes the maximum value, and converts the acquired phase current value I_t into a digital AD conversion value I_t'. Likewise, the AD converter 4 acquires a phase current value I_b front the current sensor 3, for example, at the timing when the PWM counter value becomes the minimum value and converts the acquired phase current value I_b into a digital AD conversion value I_b'.

Moreover, when the duty ratio of the PWM signal is 50% or higher, the phase current value I_t acquired at the timing when the PWM counter value becomes the maximum value is less influenced by the switching noise than the phase current value I_b acquired at the timing when the PWM counter value becomes the minimum value. Therefore, when the AD converter 4 determines that the calculated duty ratio is 50% or higher, it converts the phase current value I_t acquired at the timing when the PWM counter value becomes the maximum value into a digital value, and then outputs a digitalized AD conversion value I_t' to the dq-axis current generation unit 5.

On the other hand, when the duty ratio is less than 50%, the phase current value I_b acquired at the timing when the PWM counter value becomes the minimum value is less influenced by the switching noise than the phase current value I_t acquired at the timing when the PWM counter value becomes the maximum value. Therefore, when the AD converter 4 determines that the calculated duty ratio is less than 50%, it converts the phase current value I_b acquired at the timing when the PWM counter value becomes the minimum value into a digital value, and then outputs a digitalized AD conversion value I_b' to the dq-axis current generation unit 5.

The AD converter 4 can calculate the duty ratio of the PWM signal generated by the carrier modulation unit 10 by the following formula.

$$\text{Duty ratio} = \text{time when the phase voltage is high}/\text{one cycle of the PWM signal} \times 100[\%]$$

As shown in FIG. 2, the AD converter 4 acquires a phase current value I_b(n) in response to an ADC trigger at the timing when the PWM counter value becomes the minimum value, and converts the acquired phase current value I_b(n) into an AD conversion value I_b'(n).

Next, the AD converter 4 acquires a phase current value I_t(n) in response to the ADC trigger at the timing when the PWM counter value becomes the maximum value, and then converts the acquired phase current value I_t(n) into an AD conversion value I_t'(n).

The AD converter 4 selects one of the AD conversion values I_b'(n) and I_t'(n) according to the duty ratio of the PWM signal, and outputs the selected AD conversion value as I(n) to the dq-axis current generation unit 5.

Further, the AD converter 4 acquires a phase current value I_b(n+1) in response to the ADC trigger at the timing when the PWM counter value becomes the minimum value, and then converts the acquired phase current value I_b(n+1) into an AD conversion value I_b'(n+1). Next, the AD converter 4 acquires a phase current value I_t(n+1) in response to the ADC trigger at the timing when the PWM counter value becomes the maximum value, and then converts the acquired phase current value I_t(n+1) into an AD conversion value I_t'(n+1).

The AD converter 4 selects one of the AD conversion values I_b'(n+1) and I_t'(n+1) according to the duty ratio of the PWM signal, and then outputs the selected AD conversion value as I(n+1) to the dq-axis current generation unit 5.

The AD converter 4 repeats the AD conversion of the phase current value, the selection of the AD conversion value, and the output of the selected AD conversion value in response to the ADC trigger at the above-described timings when the PWM counter value becomes the minimum value and the maximum value.

Figure 3:
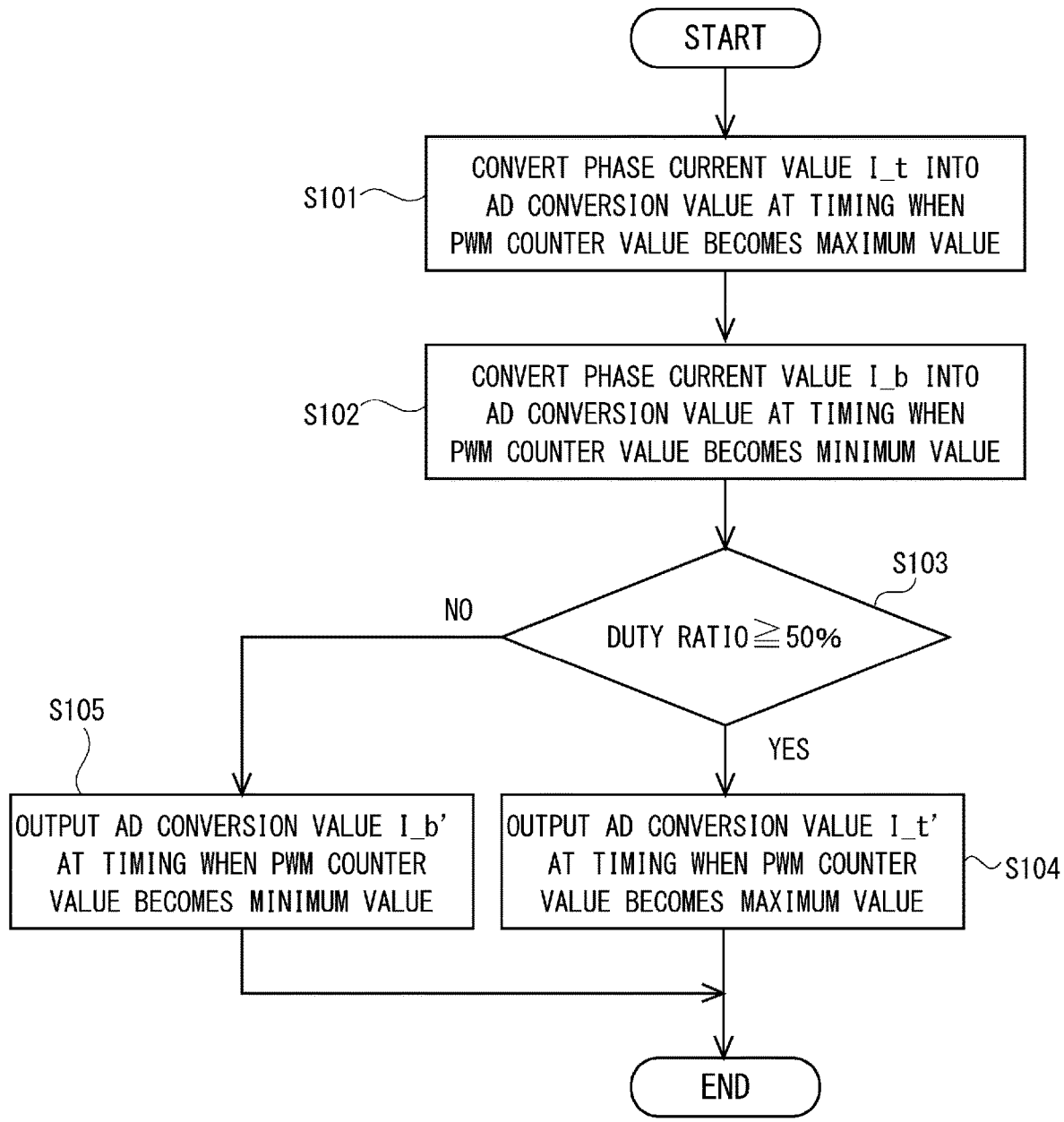
FIG. 3 is a flowchart showing a flow of a motor control method according to the first embodiment of the present disclosure.

FIG. 3 is a flowchart showing a flow of the motor control method according to the first embodiment.

For example, the AD converter 4 acquires the phase current value I_t from the current sensor 3 at the timing when the PWM counter value becomes the maximum value, and converts the acquired phase current value I_t into the AD conversion value I_t' (Step S101). The AD converter 4 acquires the phase current value I_b from the current sensor 3, for example, at, the timing, when the PWM counter value becomes the minimum value, and then converts the acquired phase current value I_b into the AD conversion value I_b' (Step S102).

The AD converter 4 determines whether the duty ratio of the PWM signal is 50% or higher (Step S103).

When the AD converter 4 determines that the duty ratio of the PWM signal is 50% or higher (YES in Step S103), it outputs the AD conversion value I_t' at the timing when the PWM counter value becomes the maximum value to the dq-axis current generation unit 5 (Step S104). On the other hand, when the AD converter 4 determines that the duty ratio of the PWM signal is less than 50% (NO in Step S103), it outputs the AD conversion value I_b' at the timing when the PWM counter value becomes the minimum value to the dq-axis current generation unit 5 (Step S105).

As described above, in the motor control apparatus 1 according to the first embodiment, when it is determined that the duty ratio of the PWM signal is 50% or higher, the AD conversion value acquired by converting the phase current value at the timing when the PWM counter value becomes the maximum value is output, whereas when it is determined that the duty ratio of the PWM signal is less than 50%, the AD conversion value acquired by converting the phase current value at the timing when the PWM counter value becomes the minimum value is output. By doing so, it is possible to prevent a switching noise from occurring and control the motor with high accuracy.

Note that the phase voltage value may form a rectangular wave which becomes low when the PMW count value is greater than or equal to the threshold and which becomes high when the PMW count value is less than the threshold. In this case, when it is determined that the duty ratio of the PWM signal is 50% or higher, the AD converter 4 outputs the AD conversion value acquired by converting the phase current value at the timing when the PWM counter value becomes the minimum value. When the AD converter 4 determines that the duty ratio of the PWM signal is less than 50%, it outputs the AD conversion value acquired by converting the phase current value at the timing when the PWM counter value becomes the maximum value.

When the duty ratio of the PWM signal is 50% or higher, the phase current value acquired at the timing when the PWM counter value becomes the minimum value is less influenced by the switching noise than the phase current value acquired at the timing when the PWM counter value becomes the maximum value. On the other hand, when the duty ratio of the PWM signal is less than 50%, the phase current value acquired at the timing when the PWM counter value becomes the maximum value is less influenced by the switching noise than the phase current value acquired at the timing when the PWM counter value becomes the minimum value. With the above configuration, it is possible to prevent a switching noise from occurring and control the motor with high accuracy.

Further, the PMW count value (carrier wave) may be a sawtooth wave. The phase voltage value forms a rectangular wave which becomes low when the PMW count value is greater than or equal to the threshold and which becomes high when the PMW count value is less than the threshold.

In this case, when the AD converter 4 determines that the duty ratio of the PWM signal is 50% or higher, it outputs the AD conversion value acquired by converting the phase current value at the timing when the PWM counter value becomes ¾ of the maximum value of the PWM counter value. When the AD converter 4 determines that the duty ratio of the PWM signal is less than 50%, it outputs the AD conversion value acquired by converting the phase current value at the timing when the PWM counter value becomes ¼ of the maximum value of the PWM counter value.

On the other hand, the phase voltage value, forms a rectangular wave which becomes low when the PMW count value is greater than or equal to the threshold and which becomes high when the PMW count value is less than the threshold. In this case, when the AD converter 4 determines that the duty ratio of the PWM signal is 50% or higher, it outputs the AD conversion value acquired by converting the phase current value at the timing when the PWM counter value becomes ¼ of the maximum value of the PWM counter value. When the AD converter 4 determines that the duty ratio of the PWM signal is less than 50%, it outputs the AD conversion value acquired by converting the phase current value at the timing when the PWM counter value becomes ¾ of the maximum value of the PWM counter value.

By doing so, even when the PMW count value is a sawtooth wave, it is possible to shift the timing of the AD conversion by the AD converter 4 from the timing when the switching noise is generated as in the case of a triangular wave. That is, it is possible to prevent a switching noise from occurring and control the motor with high accuracy.

Second Embodiment

In a second embodiment of the present disclosure, an AD converter 4 may acquire a plurality of phase current values and I_b and I_t from a current sensor 3 at the timing when a rectangular width of a rectangular wave of the phase voltage value corresponding to a PWM counter value is long, which is also the timing when the PWM counter value becomes a minimum value or a maximum value (or the timing when the PWM counter value becomes ¼ or ¾ of the minimum value or the maximum value), and then convert the acquired phase current values I_b and I_t into AD conversion values I_b' and I_t', respectively. The AD converter 4 calculates average values I_b'ave and I_t'ave of the plurality of converted AD conversion values, and outputs the calculated average values I_b'ave and I_t'ave of the AD conversion values to the dq-axis current generation unit 5.

When the AD converter 4 is fast enough for a cycle of a PWM signal, it is possible to acquire a plurality of phase current values from the current sensor 3 and convert them into AD conversion values. In this manner, the plurality of AD conversion values can be averaged, and the accuracy of the AD conversion value can be further improved.

Figure 4:
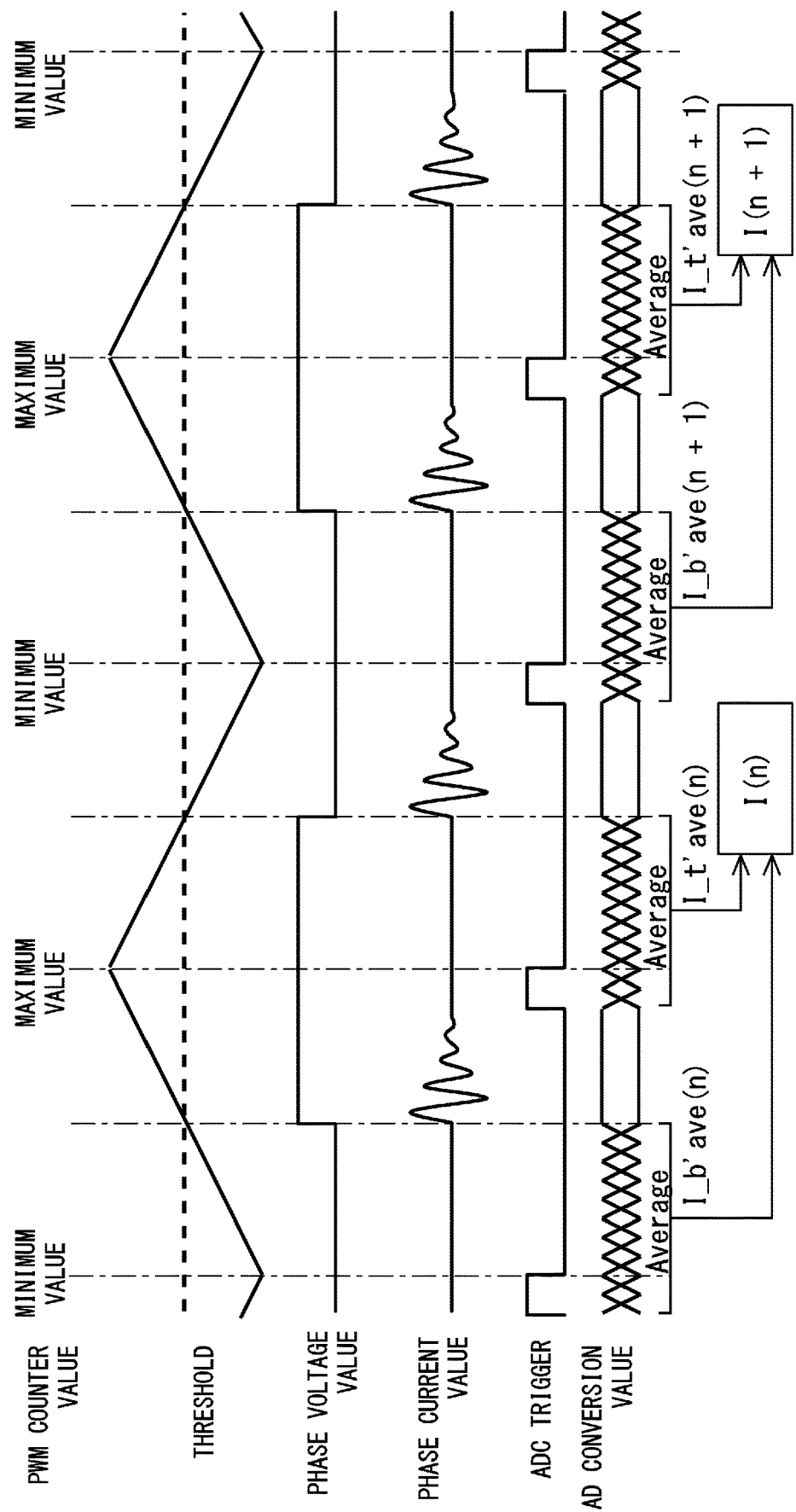
FIG. 4 is a diagram showing a state in which a phase current, value is continuously acquired a plurality of times only for a predetermined period of time.

For example, as shown in FIG. 4, the AD converter 4 continuously acquires the phase current value I_b(n) a plurality of times only for a predetermined period of time in response to one ADC trigger at the timing when the PWM counter value becomes the minimum value. The AD converter 4 converts each of the acquired plurality of phase current values I_b(n) into the AD conversion value I_b'(n). The AD converter 4 calculates an average value I_b'ave(n) of the plurality of converted AD conversion values.

Next, the AD converter 4 continuously acquires the phase current value I_t(n) a plurality of times only for a predetermined period of time in response to one ADC trigger at the timing when the PWM counter value becomes the maximum value. The AD converter 4 converts each of the acquired plurality of phase current values I_t(n) into the AD conversion value I_t'(n). The AD converter 4 calculates an average value I_t'ave(n) of the plurality of converted AD conversion values.

When the AD converter 4 determines that the duty ratio of the PWM signal is 50% or higher, it outputs, to the dq-axis current generation unit 5, the average value I_t'ave(n) of the AD conversion values at the timing when the PWM counter value becomes the maximum value. On the other hand, when the AD converter 4 determines that the duty ratio of the PWM signal is less than 50%, it outputs, to the dq-axis current generation unit 5, the average value I_b'ave(n) of the AD conversion values at the timing when the PWM counter value becomes the minimum value.

The AD converter 4 repeats the AD conversion of the phase current value, the calculation of the average value of the AD conversion values, the selection of the average value of the AD conversion values, and the output of the selected average value of the AD conversion values in response to the ADC trigger at the above-described timings when the PWM counter value becomes the minimum value and the maximum value.

Figure 5:
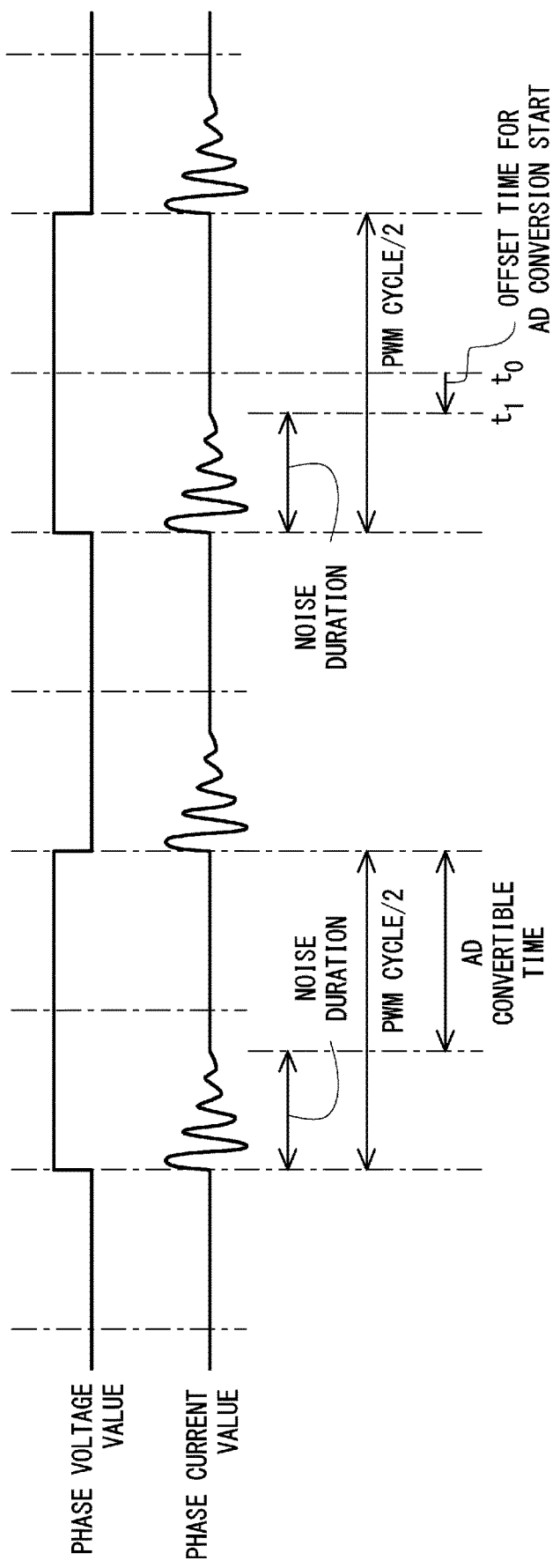
FIG. 5 is a diagram showing an AD convertible time.

Here, the AD converter 4 continuously acquires the phase current value from the current sensor 3 a plurality of times only for a predetermined period of time (AD convertible time) in response to one ADC trigger and performs the AD conversion. As shown in FIG. 5, the AD convertible time is a period of time in which the AD conversion is possible without being influenced by the switching noises.

Next, a method of calculating the AD convertible time will be described.

Figure 6:
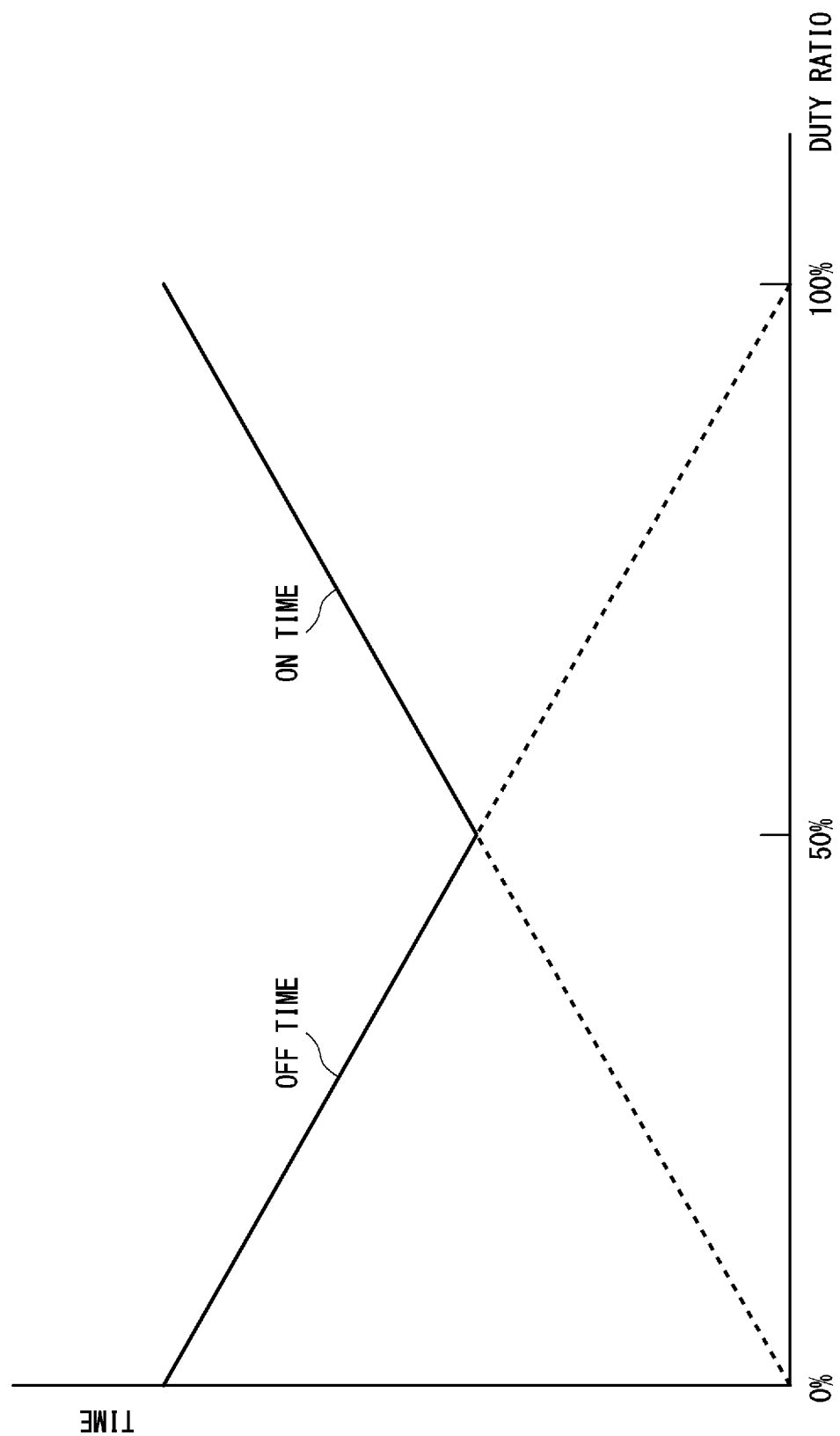
FIG. 6 is a diagram showing, an ON time with a high phase voltage and an OFF time with a low phase voltage.

As shown, in FIG. 6, within one cycle of the PWM signal, the time during which the phase voltage is high is defined as the ON time, and the time in which the phase voltage is low is defined as the OFF time. In the second embodiment, the switching noise is prevented from occurring by acquiring the phase current value in one of the ON time and OFF time, whichever is longer. For this reason, the AD convertible time is the shortest when the duty ratio is 50%.

Thus, as shown in FIG. 5, the AD convertible time can be calculated by the following formula. The following noise duration (the time for which the switching noise continues) can be calculated by a simulation or an actual measurement.

(AD convertible time)=(½ cycle of PWM signal)−(noise duration)

Usually, the AD conversion is started from t=t0. However, since the AD conversion is performed through the entire AD convertible time, t=t0 is offset ahead by an offset time, so that the AD conversion is started from t=t1. The offset time can be calculated by the following formula.

(Offset time)=(¼ cycle of PWM signal)−(noise duration)

As described above, by acquiring more phase current values, performing the AD conversion, and calculating the average value of the AD conversion values through the entire AD convertible time which is not influenced by the switching noise, it is possible to further improve the accuracy of the AD conversion value.

The AD converter 4 may acquire the plurality of phase current values I_b and I_t from the current sensor 3 at the timing when the PWM counter value becomes the minimum value or the maximum value and calculate the average value of the acquired plurality of phase current values I_b and I_t. The AD converter 4 calculates the average value of the calculated phase current values I_b and I_t and converts the average value of the calculated phase current values I_b and I_t into the AD conversion value.

Although some embodiments of the present disclosure have been described, these embodiments have been presented merely as examples and are not intended to limit the scope of the present disclosure. These novel embodiments can be implemented in various forms other than those described above. Various omissions, substitutions, and changes can be made without departing from the spirit of the present disclosure. These embodiments and modifications of the embodiments are included in the scope and the spirit of the present disclosure and included in the present disclosure described in claims and a scope of equivalents of the present disclosure.

The present disclosure can also be achieved, for example, by causing the CPU to execute a computer program that performs processes shown in FIG. 3.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.).

The program may be provided to a computer using any type of transitory computer readable media. Examples of transitory computer readable media include electric signals, optical signals, and electromagnetic waves. Transitor computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A motor control apparatus comprising:
    an inverter comprising a plurality of switching elements configured to be switched on and off;
    current detection means for detecting a phase current value output from the inverter to each phase of a three-phase AC motor;
    conversion means for converting the phase current value detected by the current detection means into a digital AD conversion value; and
    modulation means for comparing a phase voltage command value with a PWM counter value to generate a PWM signal and outputting the generated PWM signal to the inverter to thereby switch the switching elements of the inverter and control the three-phase AC motor, the phase voltage command value being calculated based on the AD conversion value from the conversion means, the PWM counter value being generated using a timer operating at predetermined cycles, wherein
    a rectangular wave of a phase voltage value corresponding to the PWM counter value has a long rectangular width and a short rectangular width alternately, the long rectangular width has a longer width than the short rectangular width, and
    the conversion means outputs the AD conversion value acquired by converting the phase current value at a timing when the rectangular width of the rectangular wave becomes the long rectangular width.

2. The motor control apparatus according to claim 1, wherein
    the PWM counter value is a triangular wave,
    when the phase voltage value is made high while the PWM counter value is greater than or equal to a threshold, and the phase voltage value is made low while the PWM counter value is less than the threshold, if the conversion means determines that a duty ratio of the PWM signal is 50% or higher, it outputs the AD conversion value acquired by converting the phase current value at a timing when the PWM counter value becomes a maximum value, whereas if the conversion means determines that the duty ratio of the PWM signal is less than 50%, it outputs the AD conversion value acquired by converting the phase current value at a timing when the PWM counter value becomes a minimum value, and
    when the phase voltage value is made low while the PWM counter value is greater than or equal to the threshold, and the phase voltage value is made high while the PWM counter value is less than the threshold, if the conversion means determines that the duty ratio of the PWM signal is 50% or higher, it outputs the AD conversion value acquired by converting the phase current value at the timing when the PWM counter value becomes the minimum value, whereas if the conversion means determines that the duty ratio of the PWM signal is less than 50%, it outputs the AD conversion value acquired by converting the phase current value at the timing when the PWM counter value becomes the maximum value.

3. The motor control apparatus according to claim 1, wherein the PWM counter value is a sawtooth wave, when the phase voltage value is made high while the PWM counter value is greater than or equal to a threshold, and the phase voltage value is made low while the PWM counter value is less than the threshold, if the conversion means determines that a duty ratio of the PWM signal is 50% or higher, it outputs the AD conversion value acquired by converting the phase current value at a timing when the PWM counter value becomes ¾ of a maximum value of the PWM counter value, whereas if the conversion means determines that the duty ratio of the PWM signal is less than 50%, it outputs the AD conversion value acquired by converting the phase current value at a timing when the PWM counter value becomes ¼ of the maximum value of the PWM counter value, and when the phase voltage value is made low while the PWM counter value is greater than or equal to the threshold, and the phase voltage value is made high while the PWM counter value is less than the threshold, if the conversion means determines that the duty ratio of the PWM signal is 50% or higher, it outputs the AD conversion value acquired by converting the phase current value at the timing when the PWM counter value becomes ¼ of the minimum value of the PWM counter value, whereas if the conversion means determines that the duty ratio of the PWM signal is less than 50%, it outputs the AD conversion value acquired by converting the phase current value at the timing when the PWM counter value becomes ¾ of the maximum value of the PWM counter value.

4. The motor control apparatus according to claim 1, wherein the conversion means acquires the phase current value a plurality of times only for a predetermined period of time at the timing when the rectangular width of the rectangular wave of the phase voltage value corresponding to the PWM counter value becomes the long rectangular width, converts each of the acquired plurality of phase current values into the AD conversion value, and outputs an average value of the plurality of converted AD conversion values.

5. The motor control apparatus according to claim 4, wherein the predetermined period of time is calculated by subtracting a duration of a switching noise in the switching elements from a ½ cycle of the PWM signal.

6. A method of controlling a motor control apparatus, the motor control apparatus comprising an inverter, the inverter comprising a plurality of switching elements configured to be switched on and off, and the method comprising:

detecting a phase current value output from the inverter to each phase of a three-phase AC motor;

converting the detected phase current value into a digital AD conversion value; and comparing a phase voltage command value with a PWM counter value to generate a PWM signal;

outputting the generated PWM signal to the inverter to thereby switch the switching elements of the inverter and control the three-phase AC motor, the phase voltage command value being calculated based on the AD conversion value from the conversion means, and the PWM counter value being generated using a timer operating at predetermined cycles, wherein a rectangular wave of a phase voltage value corresponding to the PWM counter value has a long rectangular width and a short rectangular width alternately, the long rectangular width has a longer width than the short rectangular width; and outputting the AD conversion value acquired by converting the phase current value at a timing when the rectangular width of the rectangular wave becomes the long rectangular width.

7. A non-transitory computer readable medium storing a program for a motor control apparatus, the motor control apparatus comprising an inverter, the inverter comprising a plurality of switching elements configured to be switched on and off, and the program causing a computer to execute:

detecting a phase current value output from the inverter to each phase of a three-phase AC motor;

converting the detecting phase current value into a digital AD conversion value; and comparing a phase voltage command value with a PWM counter value to generate a PWM signal;

outputting the generated PWM signal to the inverter to thereby switch the switching elements of the inverter and control the three-phase AC motor, the phase voltage command value being calculated based on the AD conversion value from the conversion means, and the PWM counter value being generated using a timer operating at predetermined cycles, wherein a rectangular wave of a phase voltage value corresponding to the PWM counter value has a long rectangular width and a short rectangular width alternately, the long rectangular width has a longer width than the short rectangular width; and outputting the AD conversion value acquired by converting the phase current value at a timing when the rectangular width of the rectangular wave becomes the long rectangular width.

8. A motor control apparatus comprising:

an inverter comprising a plurality of switching elements configured to be switched on and off;

a current sensor configured to detect a phase current value output from the inverter to each phase of a three-phase AC motor;

a converter configured to convert the phase current value detected by the current sensor into a digital AD conversion value; and a modulator configured to compare a phase voltage command value with a PWM counter value to generate a PWM signal and outputting the generated PWM signal to the inverter to thereby switch the switching elements of the inverter and control the three-phase AC motor, the phase voltage command value being calculated based on the AD conversion value from the conversion, the PWM counter value being generated using a timer operating at predetermined cycles, wherein a rectangular wave of a phase voltage value corresponding to the PWM counter value has a long rectangular width and a short rectangular width alternately, the long rectangular width has a longer width than the short rectangular width, and the converter outputs the AD conversion value acquired by converting the phase current value at a timing when the rectangular width of the rectangular wave becomes the long rectangular width.

* * * * *